United States Patent
Morita et al.

(10) Patent No.: US 11,325,600 B2
(45) Date of Patent: May 10, 2022

(54) VEHICLE CONTROL METHOD AND VEHICLE CONTROL DEVICE

(71) Applicant: NISSAN MOTOR CO., LTD., Yokohama (JP)

(72) Inventors: Tetsunobu Morita, Kanagawa (JP); Hiroshi Arita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 259 days.

(21) Appl. No.: 16/500,029

(22) PCT Filed: Apr. 4, 2017

(86) PCT No.: PCT/JP2017/014125
§ 371 (c)(1),
(2) Date: Oct. 1, 2019

(87) PCT Pub. No.: WO2018/185848
PCT Pub. Date: Oct. 11, 2018

(65) Prior Publication Data
US 2020/0180632 A1    Jun. 11, 2020

(51) Int. Cl.
*B60W 10/06* (2006.01)
*B60W 10/18* (2012.01)
(Continued)

(52) U.S. Cl.
CPC ......... *B60W 30/18127* (2013.01); *B60L 7/10* (2013.01); *B60W 10/06* (2013.01);
(Continued)

(58) Field of Classification Search
CPC ........... B60W 30/18127; B60W 10/06; B60W 10/18; B60W 20/14; B60W 2510/182; B60W 2540/12; B60W 2720/10; B60W 2540/10; B60W 2050/002; B60W 10/08; B60W 30/14; B60L 7/10; B60K 6/48; B60Y 2200/92; Y02T 10/40; Y02T 10/62; B60T 8/00
See application file for complete search history.

(56) References Cited

FOREIGN PATENT DOCUMENTS

JP    2008-195143 A    8/2008
JP    2012-86794 A    5/2012
(Continued)

*Primary Examiner* — Brian P Sweeney
(74) *Attorney, Agent, or Firm* — Foley & Lardner LLP

(57) ABSTRACT

The present invention provides a vehicle control method capable of suppressing an increase in the frequency of stopping and restarting of the engine when the braking device is activated at the self-driving mode. When the operation mode is set as self-driving, the braking device is activated in accordance with a system deceleration request to keep an actual vehicle-speed at a target vehicle-speed or change the actual vehicle-speed at the target vehicle-speed or lower depending on environment surrounding the vehicle. Further, a braking amount is estimated, the braking amount is a magnitude of a braking force generated from the activated braking device. When the braking amount is an engine-stopping enabling threshold or more, enabling stopping is allowed. When the braking amount is less than the engine-stopping enabling threshold, enabling stopping is not allowed.

5 Claims, 7 Drawing Sheets

(51) Int. Cl.
*B60L 7/10* (2006.01)
*B60W 30/18* (2012.01)
*B60W 20/14* (2016.01)
*B60K 6/48* (2007.10)

(52) U.S. Cl.
CPC .............. *B60W 10/18* (2013.01); *B60K 6/48* (2013.01); *B60W 20/14* (2016.01); *B60W 2510/182* (2013.01); *B60W 2540/12* (2013.01); *B60W 2720/10* (2013.01); *B60Y 2200/92* (2013.01)

(56) References Cited

FOREIGN PATENT DOCUMENTS

| | | | |
|---|---|---|---|
| JP | 2015/013509 A | * | 1/2015 |
| JP | 2015-13509 A | | 1/2015 |

* cited by examiner

VEHICLE CONTROL METHOD AND VEHICLE CONTROL DEVICE

TECHNICAL FIELD

The present invention relates to vehicle control methods and vehicle control devices.

BACKGROUND ART

Conventionally known vehicles include a braking device to give a braking force to the vehicle in accordance with a deceleration request in response to a driver's braking operation (driver's deceleration request), and are configured to disconnect the engine from a driving system to stop in response to such a driver's braking operation (see Patent Document 1, for example).

Patent Document 1: JP 2008-195143 A

SUMMARY OF INVENTION

When a driver sets the vehicle at a self-driving mode to allow the actual vehicle-speed of the vehicle to keep a target vehicle-speed without any pedal operation by the driver, this self-driving mode generates a subtle deceleration request (system deceleration request) to which the driver typically does not react. In such a case, the braking device reacts to such a request as well. This means that the braking device is activated more frequently than at the manual-driving mode based on the driver's pedal operation.

If the engine of the vehicle stops during the self-driving mode in response to the activation of the braking device similarly to the manual-driving mode, the frequency to repeat the stopping and restarting of the engine increases more than that at the manual-driving mode, and this bothers the driver.

In view of the problem, the present disclosure aims to provide a vehicle control method and a vehicle control device capable of suppressing an increase in the frequency of stopping and restarting of the engine when the braking device is activated at the self-driving mode.

To achieve the aim, a vehicle control method of the present disclosure controls a vehicle including: a braking device configured to give a braking force to the vehicle in accordance with a driver's deceleration request in response to a driver's braking operation when an operation mode of the vehicle is not set as self-driving; and an engine configured to stop in response to an activation of the braking device.

When the operation mode is set as self-driving, the method firstly activates the braking device in accordance with a system deceleration request to keep an actual vehicle-speed at a set vehicle-speed or change the actual vehicle-speed at the set vehicle-speed or lower depending on the environment surrounding the vehicle.

Next the method detects or estimates a braking amount that is a magnitude of a braking force generated from the activated braking device.

When the braking amount is an engine-stopping enabling threshold or more, the method enables stopping of the engine, and when the braking amount is less than the engine-stopping enabling threshold, the method does not enable stopping of the engine.

The present disclosure therefore suppresses an increase in the frequency of stopping and restarting of the engine when the braking device is activated during the self-driving mode.

DESCRIPTION OF EMBODIMENTS

Figure 1:
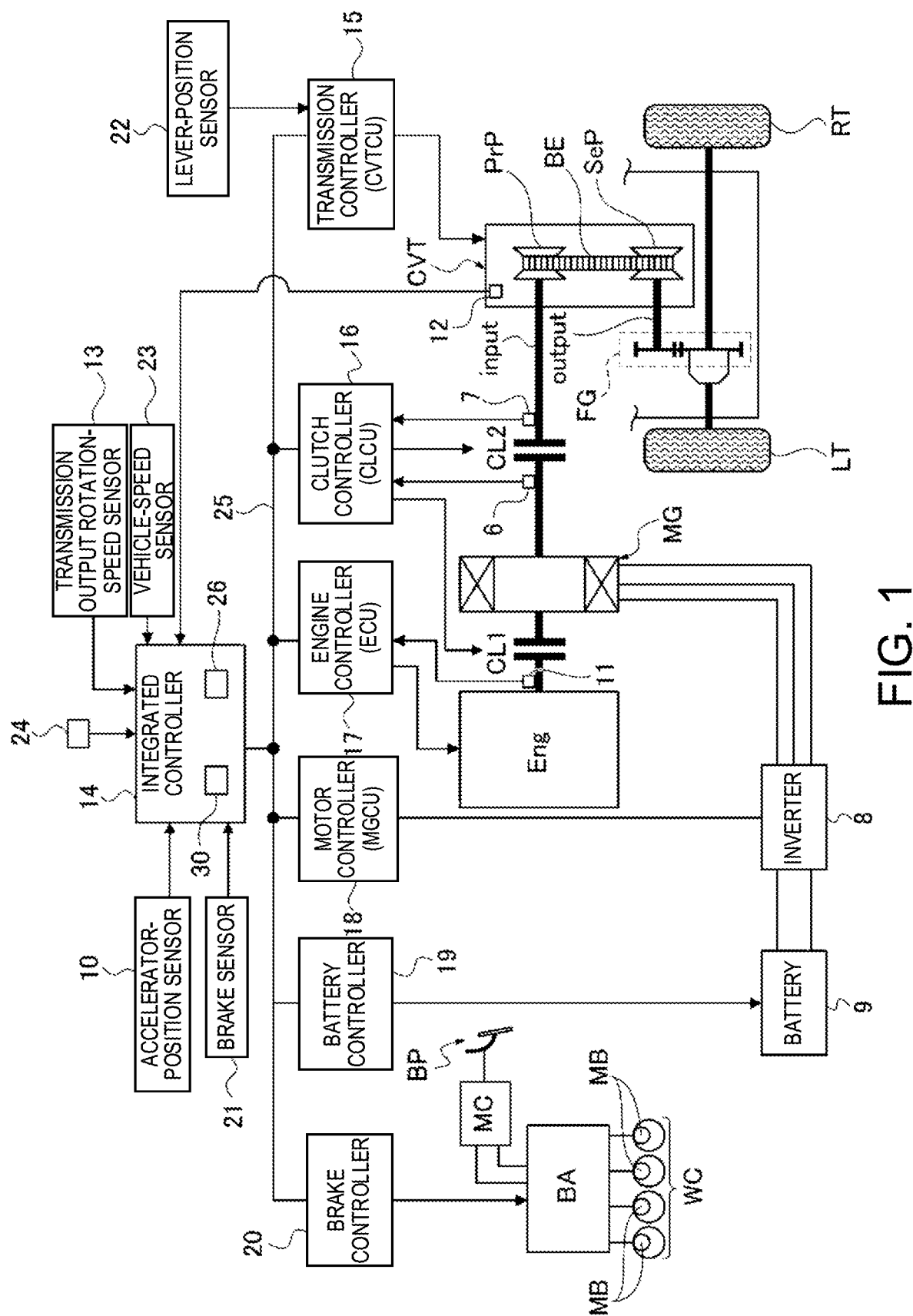
FIG. 1 shows the overall structure of an FF hybrid vehicle to which a vehicle control method and a control device in Example 1 are applied.

The following describes one embodiment of a vehicle control method and a vehicle control device according to the present disclosure, by way of Example 1 shown in the drawings.

Example 1

Firstly the structure is described below.

A vehicle control method and a control device in Example 1 are applied to an FF hybrid vehicle including a parallel hybrid driving system called a 1-motor/2-clutche type. The following describes the structure of an FF hybrid vehicle, to which the control method and the control device of Example 1 are applied, about the "detailed structure of a driving system", the "detailed structure of operation modes", the "detailed structure of a control system" and the "configuration of engine-stopping enabling determination".

[Detailed Structure of a Driving System]

As shown in FIG. 1, the driving system of the FF hybrid vehicle includes an engine Eng, a first clutch CL1, a motor generator MG (motor), a second clutch CL2, a continuously variable transmission CVT, a final gear FG, a left driving wheel LT and a right driving wheel RT. This FF hybrid vehicle includes a brake-fluid pressure actuator BA as well.

The torque of the engine Eng is controlled so that the engine torque agrees with the instructed value by controlling the intake air mass by a throttle actuator, the amount of fuel injection by an injector, and the ignition timing by an ignition plug. The engine Eng may operate at the cranking-operation mode to engage with the first clutch CL1 in a fuel-cutting state (while stopping the fuel supply) and not at the combustion-operation mode. The engine at the cranking-operation mode generates a friction torque due to frictional sliding resistance between the piston and the cylinder inner wall.

The first clutch CL1 is inserted between the engine Eng and the motor generator MG. For this first clutch CL1, a dry multi-plate clutch of a normally open type may be used, for example, for engagement/slip engagement/releasing between the engine Eng and the motor generator MG. While this first clutch CL1 in the completely engagement state transmits the motor torque+the engine torque to the second clutch CL2, the first clutch CL1 in the releasing state transmits the motor torque only to the second clutch CL2. The engagement/slip engagement/releasing of the first clutch CL1 is hydraulically controlled, i.e., the transmitted torque (clutch torque capacity) is generated in accordance with the hydraulic pressure of the clutch (pressing force).

The motor generator MG has an AC synchronous motor structure, and controls the motor torque and the motor rotation speed during the starting and the running. The motor generator MG also recovers (charges) the vehicle kinetic energy generated by regenerative braking control to the battery 9 during braking and deceleration.

That is, this motor generator MG gives a driving force to the vehicle during stopping of the engine Eng, and enables regeneration. This motor generator MG gives a regenerative force generated during the regenerative braking control to the vehicle as a braking force, and so functions as a braking device to give a braking force to the FF hybrid vehicle in response to a deceleration request.

The second clutch CL2 is a wet multi-plate clutch or a wet multi-plate brake of a normally open type that is disposed at forward/backward changeover system in a continuously variable transmission CVT. The second clutch CL2 generates a transmitted torque (clutch torque capacity) in accordance with the hydraulic pressure of the clutch (pressing force). This second clutch CL2 transmits the torque output from the engine Eng and the motor generator MG (engaged with the first clutch CL1) to the left and right driving wheels LT and RT via the continuously variable transmission CVT and the final gear FG. This second clutch CL2 may be disposed at a position between the continuously variable transmission CVT and the left and right driving wheels LT, RT instead of a position between the motor generator MG and the continuously variable transmission CVT as in FIG. 1.

The continuously variable transmission CVT is a belt-type continuously variable transmission and includes a primary pulley PrP connecting to the input shaft (input) of the transmission, a secondary pulley SeP connecting to the output shaft (output) of the transmission, and a pulley belt BE that runs between the primary pulley PrP and the secondary pulley SeP.

The primary pulley PrP has a fixed sheave fixed to the transmission input shaft (input) and a movable sheave that is slidably supported at the transmission input shaft (input). The secondary pulley SeP has a fixed sheave fixed to the transmission output shaft (output) and a movable sheave that is slidably supported at the transmission output shaft (output).

The pulley belt BE is a metal belt that runs between the primary pulley PrP and the secondary pulley SeP, and is held between the fixed sheave and the movable sheave of each pulley. For the pulley belt BE, a pin-type belt or a VDT type belt may be used in this example.

The continuously variable transmission CVT is configured to change the pulley width of these pulleys PrP and SeP, and accordingly change the diameter of the face for running of the pulley belt BE so as to freely control the transmission ratio (pulley ratio). A larger pulley width of the primary pulley PrP as well as a smaller pulley width of the secondary pulley SeP change the transmission ratio to Low. A smaller pulley width of the primary pulley PrP as well as a larger pulley width of the secondary pulley SeP change the transmission ratio to High.

The brake-fluid pressure actuator BA controls the wheel cylinder hydraulic pressure to be supplied to the friction brake MB disposed at the wheel cylinder WC of each wheel in accordance with a hydraulic-pressure command that the master cylinder MC converts the tread power given to the brake pedal BP and a braking force command from the brake controller 20.

Receiving the wheel cylinder hydraulic pressure, this friction brake MB gives a friction force generated with the wheel cylinder WC as a braking force to the vehicle, and so functions as a braking device to give a braking force to the FF hybrid vehicle in response to a deceleration request.

[Detailed Structure of Operation Modes]

The FF hybrid vehicle of Example 1 has some operation modes, such as an electric vehicle mode (hereinafter called "EV mode") and a hybrid electric vehicle mode (hereinafter called "HEV mode"), by the driving system as stated above.

In the "EV mode", the first clutch CL1 is released and the second clutch CL2 is engaged so that the engine Eng is disconnected from the driving system and the motor generator MG only is connected to the left and right driving wheels LT, RT to transmit the driving force. With this configuration, during driven-running to give a driving force to the vehicle, the "EV mode" controls the motor generator MG to perform the powering. In this case, this motor generator MG functions as a driving source for running (motor). During deceleration-running to give a braking force to the vehicle, the "EV mode" controls the motor generator MG to perform the regeneration. In this case, the motor generator MG functions as a driving source for power generation (generator), and the regenerative force generated is used as a braking force.

"Controlling the motor generator MG to perform the powering" means supplying electricity from the inverter 8 to the motor generator MG, so that the motor generator MG in the powering state drives the left and right driving wheels LT and RT. "Controlling the motor generator MG to perform the regeneration" means controlling the motor generator MG to be in the regeneration state where the rotation energy of the motor generator MG and the left and right driving wheels LT and RT flow into the inverter 8.

In the "HEV mode", the first clutch CL1 is engaged and the second clutch CL2 is engaged so that both of the motor generator MG and the engine Eng are connected to the left and right driving wheels LT, RT to transmit the driving force. With this configuration, during driven-running, the "HEV mode" controls the motor generator MG to perform the powering while supplying fuel to the engine Eng. In this case, the engine Eng and the motor generator MG function as a driving source for running. During deceleration-running, the "HEV mode" controls the motor generator MG to perform the regeneration, and the regenerative force generated is used as a braking force. During deceleration, the engine Eng may be in the cranking-operation state (to rotate along with the motor generator MG) so as to generate friction torque. This friction torque by the engine Eng (engine friction) may be used as the braking force.

Figure 2:
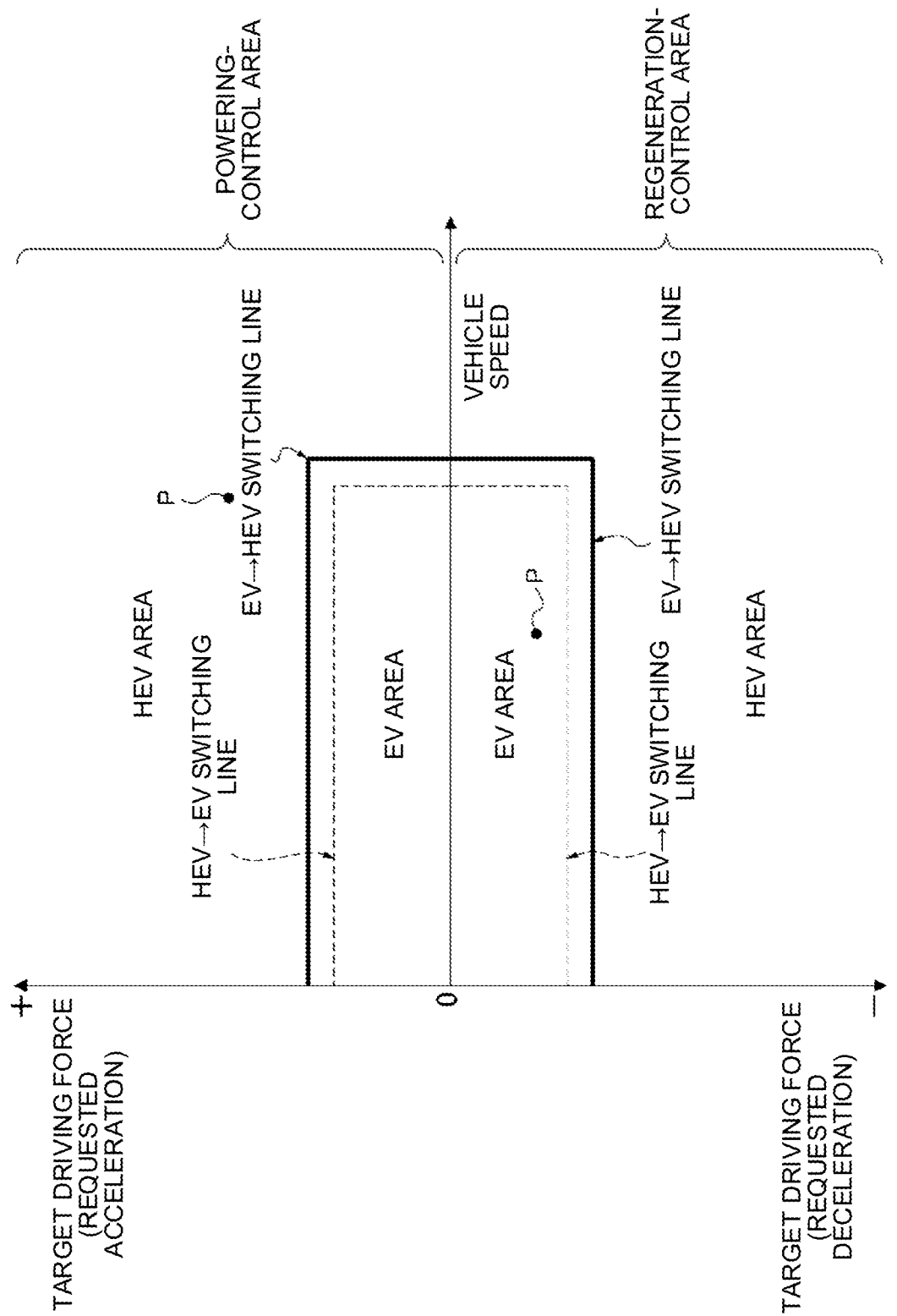
FIG. 2 shows one example of a mode-shift map used in Example 1.

The mode shift between the "EV mode" and the "HEV mode" is performed based on requested acceleration or requested deceleration that is a target driving force and a mode-shift map shown in FIG. 2. Specifically during driven-running, an operating point P is set in the powering-control area that is above the zero-axis of the target driving force in FIG. 2, where the operating point P is set in accordance with the requested acceleration that is a target driving force as a positive value and the vehicle-speed. When this operating point P is in the EV area, the "EV mode" is selected. When the operating point P is in the HEV area, the "HEV mode" is selected.

During deceleration-running, an operating point P is set in the regeneration-control area that is below the zero-axis of the target driving force in FIG. 2, where the operating point P is set in accordance with the requested deceleration that is a target driving force as a negative value. When this operating point P is in the EV area, the "EV mode" is selected. When the operating point P is in the HEV area, the "HEV mode" is selected.

The "EV area" is an area to let the vehicle run with electricity, having a small absolute value of the requested acceleration or the requested deceleration (target driving force). The "HEV area" is an area to let the vehicle run in a hybrid manner, having an absolute value of the requested acceleration or the requested deceleration (target driving force) that is larger than that in the EV area. These EV area and HEV area are segmented by the EV→HEV switching line and the HEV→EV switching line.

The EV→HEV switching line is set so that, when the operating point P in the EV area crosses this line, the operation mode shifts from the "EV mode" to the "HEV mode". In FIG. 2, the solid line indicates the EV→HEV switching line. The HEV→EV switching line is set so that, when the operating point P in the HEV area crosses this line, the operation mode shifts from the "HEV mode" to the "EV mode". In FIG. 2, the broken line indicates the HEV→EV switching line. These HEV→EV switching line and EV→HEV switching line, which are for segmentation of the EV area and the HEV area, are set while having a predetermined amount of hysteresis.

The calculation method of the requested acceleration and the requested deceleration (target driving force) depends on the driving mode. Specifically when the self-driving mode is set, they are calculated based on the target vehicle-speed and the actual vehicle-speed. When the manual-driving mode is set (i.e., self-driving mode is not set), they are calculated based on the vehicle-speed and the driver's driving operation (in this case, the accelerator position (accelerator opening degree) and the tread force to the brake).

That is, when the self-driving mode is set, the method firstly sets any target vehicle-speed, and sets requested acceleration or requested deceleration (target driving force) in accordance with the set target vehicle-speed as an initial value. Next the method detects the actual vehicle-speed with a vehicle-speed sensor 23, and calculates a difference between the detected actual vehicle-speed and the target vehicle-speed. Then the method calculates a required speed adjustment to keep this difference in a predetermined range, and adds the speed adjustment to the initial value of the requested acceleration or the requested deceleration (target driving force) to obtain new requested acceleration or new requested deceleration (target driving force). In this way, when the self-driving mode is set, the method calculates the requested acceleration and the requested deceleration (target driving force) by feedback controlling based on the actual vehicle-speed. Hereinafter such acceleration request issued for the self-driving mode is called a "system acceleration request", and such deceleration request issued for the self-driving mode is called a "system deceleration request".

When the manual-driving mode is set, the method sets requested acceleration (target driving force as a positive value) based on the operating point depending on the vehicle-speed and the accelerator position and a preset driving-force setting map, and sets requested deceleration (target driving force as a negative value) based on the operating point depending on the vehicle-speed and the tread force to the brake (braking operation) and a preset braking-force setting map. Hereinafter such acceleration request issued for the manual-driving mode is called a "driver's acceleration request", and such deceleration request issued for the manual-driving mode is called a "driver's deceleration request".

The "self-driving mode" calculates the target driving force by feedback control and controls the actual vehicle-speed to follow the target vehicle-speed. This allows the vehicle to automatically run at the set vehicle-speed (target vehicle-speed) without driver's operation of the accelerator pedal or the brake pedal (auto-cruise running mode). In other words, the self-driving mode outputs an acceleration request or a deceleration request, and keeps the actual vehicle-speed at the target vehicle-speed, or changes the actual vehicle-speed at the target vehicle-speed or lower depending on the environment surrounding the vehicle.

Specifically this "self-driving mode" covers a system concept, such as ICC (Intelligent Cruise Control), ACC (Adaptive Cruise Control), or ASCD (Auto Speed Control Device). Among these self-driving modes, ASCD, for example, has a vehicle-speed control function to set any vehicle-speed set by the driver as the "target vehicle-speed" and let the actual vehicle-speed follow this "target vehicle-speed". ICC or ACC has a function to automatically control an inter-vehicle distance in addition to the function to control the vehicle-speed. This system concept sets any vehicle-speed as the "target vehicle-speed" based on the information from a radar sensor or a camera, for example, installed at a front part of the vehicle when no car is running ahead. When a car is running ahead, the ICC or ACC sets a vehicle-speed to keep the preset inter-vehicle distance constant as the "target vehicle-speed" for control.

The self-driving mode controls the engine Eng, the motor generator MG, the continuously variable transmission CVT, and the brake-fluid pressure actuator BA independently of the driver's driving operation, so as to control the driving force and the braking force of the vehicle and so adjust the acceleration and deceleration. In response to an acceleration request, the self-driving mode generates a driving force with the output torque from the motor generator MG or the engine Eng. In response to a deceleration request, the self-driving mode firstly generates a braking force with the regenerative force of the motor generator MG. If the braking force obtained from the regenerative force is insufficient for the deceleration request, the self-driving mode generates a necessary braking force with the engine brake force (engine friction) and the hydraulic brake force.

In the "manual-driving mode", the driver operates the accelerator pedal and the brake pedal to control the vehicle-speed for running. Note here that, when the "manual-driving mode" is set as the driving mode, the "HEV mode" activates the motor generator MG and the friction brake MB as the braking devices for deceleration in response to a driver's deceleration request with the driver's braking operation (releasing the foot from the accelerator pedal or treading on the brake pedal BP), and releases the first clutch CL1 to stop the engine Eng.

When the absolute value of the requested acceleration or the requested deceleration increases so that the operating point P in the EV area crosses the EV→HEV switching line to shift to the HEV area, the first clutch CL1 is engaged to switch from the "EV mode" to the "HEV mode". That is, the mode is shifted from EV to HEV. When this mode shift from EV to HEV is based on an acceleration request, the combustion of the engine Eng also starts in addition to the engagement of the first clutch CL1.

When the absolute value of the requested acceleration or the requested deceleration decreases so that the operating point P in the HEV area crosses the HEV→EV switching line to shift to the EV area, the first clutch CL1 is released and the engine Eng is stopped to switch from the "HEV mode" to the "EV mode". That is, the mode is shifted from HEV to EV.

[Detailed Structure of a Control System]

As shown in FIG. 1, a control system of the FF hybrid vehicle includes an integrated controller 14, a transmission controller 15, a clutch controller 16, an engine controller 17, a motor controller 18, a battery controller 19, and a brake controller 20. The control system includes, as sensors, a motor-rotation-speed sensor 6, a transmission input rotation-speed sensor 7, an accelerator-position sensor 10, an engine-revolution-speed sensor 11, an oil-temperature sensor 12, and a transmission output rotation-speed sensor 13. The control system also includes a brake sensor 21, a lever-position sensor 22, a vehicle-speed sensor 23, and a self-driving setting switch sensor 24.

The integrated controller 14 calculates requested acceleration or requested deceleration (target driving force) from the battery condition, the accelerator position, the vehicle-speed (a value in synchronization with the output rotation-speed of the transmission), the hydraulic oil temperature, the target vehicle-speed and the like. Based on the calculation of the requested acceleration or the requested deceleration, the integrated controller 14 calculates a command value to each of the actuators (the motor generator MG, the engine Eng, the first clutch CL1, the second clutch CL2, the continuously variable transmission CVT, and the brake-fluid pressure actuator BA), and transmits the calculated command values to the corresponding controllers 15, 16, 17, 18, 19, and 20 via CAN communication wire 25.

The transmission controller 15 performs transmission control so as to fulfill the transmission command from the integrated controller 14 by controlling the hydraulic pressure of the oil supplied to the primary pulley PrP and the secondary pulley SeP of the continuously variable transmission CVT.

Figure 3:
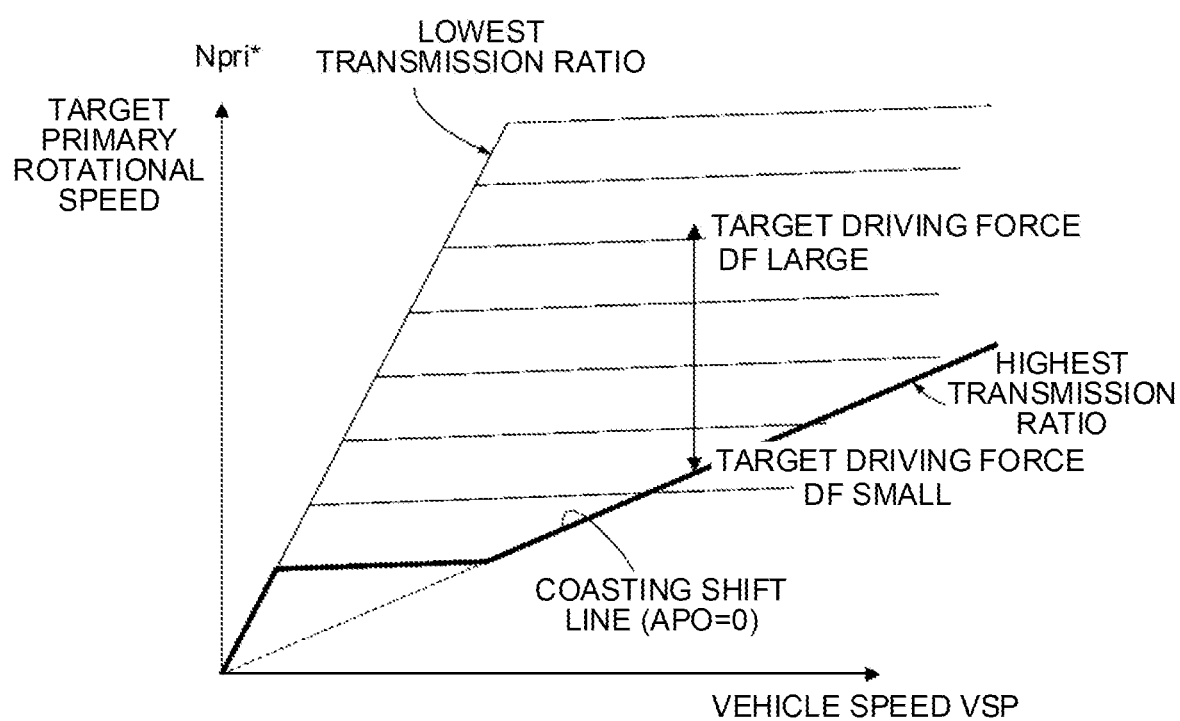
FIG. 3 shows one example of a transmission schedule map used in Example 1.

The transmission control by the transmission controller 15 is based on a transmission schedule map shown in FIG. 3 and the operating point depending on the vehicle-speed VSP and the target driving force DF (absolute value of the requested acceleration or the requested deceleration), and determines a target primary number of revolutions Npri* based on the operating point (VSP, DF) on the transmission schedule. As shown in FIG. 3, the transmission schedule changes the transmission ratio in the transmission-ratio width between the Lowest transmission ratio and the Highest transmission ratio based on the operating point (VSP, DF). The thick line of FIG. 3 indicates the coasting shift line in response to the releasing of the driver's foot from the accelerator pedal. In one example, a decrease in the vehicle-speed VSP (deceleration) during the coasting EV running at the highest transmission ratio causes the downshift from the Highest transmission ratio to the Lowest transmission ratio.

The clutch controller 16 receives sensor information from sensors, such as the engine-revolution-speed sensor 11, the motor-rotation-speed sensor 6, and the transmission input rotation-speed sensor 7, and outputs a clutch hydraulic pressure command value to the first clutch CL1 and the second clutch CL2. This sets the pressing force to the first clutch CL1 and the pressing force to the second clutch CL2.

The engine controller 17 receives sensor information from the engine-revolution-speed sensor 11 and controls the torque of the engine Eng so as to fulfill the engine-torque command value from the integrated controller 14. When receiving a fuel-cutting command from the integrated controller 14, the engine controller 17 stops the fuel-supplying to the engine Eng.

The motor controller 18 outputs a control command to the inverter 8 so as to fulfill the motor-torque command value, the motor-rotation-speed command value, and the regenerative force command from the integrated controller 14, and controls the motor torque, the motor rotation speed and the regenerative brake of the motor generator MG. The inverter 8 converts DC/AC, and changes the discharging current from the battery 9 to the driving current for the motor generator MG. The inverter 8 also changes the current generated from the motor generator MG to the charging current for the battery 9.

The battery controller 19 manages the charging capacity SOC of the battery 9, and transmits the SOC information to the integrated controller 14 and the engine controller 17.

The brake controller 20 receives sensor information from the brake sensor 21, and outputs a braking-force command to the brake-fluid pressure actuator BA so as to fulfill the braking command from the integrated controller 14 to control the brake-fluid pressure.

The self-driving setting switch sensor 24 detects an operation signal of the self-driving switch that the driver turns ON/OFF. When the self-driving switch turns ON, the self-driving setting switch sensor 24 transmits a self-driving command to the integrated controller 14. This sets a self-driving mode. When the self-driving switch turns OFF, the self-driving setting switch sensor 24 transmits a self-driving cancel command to the integrated controller 14. This cancels the self-driving mode and sets a manual-driving mode.

The self-driving mode is configured so as to, when the driver operates with an accelerator pedal to increase the vehicle-speed to any vehicle-speed not lower than the predetermined vehicle-speed, and operates the self-driving setting switch to turn ON, set this vehicle-speed as a target vehicle-speed. After that, when a car running ahead is detected based on the information from a not-illustrated radar sensor, for example, the self-driving mode sets a vehicle-speed to keep the inter-vehicle distance from the detected vehicle constant as the target vehicle-speed.

When a driver performs a predetermined pedal operation, such as pressing the brake pedal, the self-driving setting switch sensor 24 transmits a self-driving cancel command to the integrated controller 14 without the OFF-operation of the self-driving switch by the driver. This cancels the self-driving mode and switches to the manual-driving mode.

In this Example 1, the integrated controller 14 (control device of the vehicle) includes a cruise control unit 26 (vehicle-speed control unit) and an engine-stop control unit 30.

Receiving a self-driving command, the cruise control unit 26 receives the target vehicle-speed and the actual vehicle-speed and calculates requested acceleration or requested deceleration (target driving force) to let the actual vehicle-speed follow the target vehicle-speed. Based on this requested acceleration or requested deceleration, the cruise control unit 26 outputs a command (system acceleration request or system deceleration request) to the transmission controller 15, the engine controller 17, the motor controller 18, and the brake controller 20.

"Letting the actual vehicle-speed follow the target vehicle-speed" means keeping the actual vehicle-speed at the target vehicle-speed or changing the actual vehicle-speed at the target vehicle-speed or lower depending on the environment surrounding the vehicle.

Receiving a command from the cruise control unit 26, the transmission controller 15 performs transmission control based on the requested acceleration or the requested deceleration calculated by the cruise control unit 26. Receiving a command from the cruise control unit 26, the engine controller 17 performs engine-torque control and fuel-cutting control depending on the running mode, such as constant-speed running, running to follow a vehicle ahead, acceleration running, or deceleration running. Receiving a command from the cruise control unit 26, the motor controller 18 performs motor-rotation-speed control, motor-torque control, and regenerative-brake control, for example, depending on the running mode, such as constant-speed running.

Receiving a command from the cruise control unit 26, the brake controller 20 outputs a braking-force command to the brake-fluid pressure actuator BA to perform brake-fluid-pressure control depending on the running mode, such as deceleration running or running to follow a vehicle ahead, and activates the friction brake MB.

Figure 4:
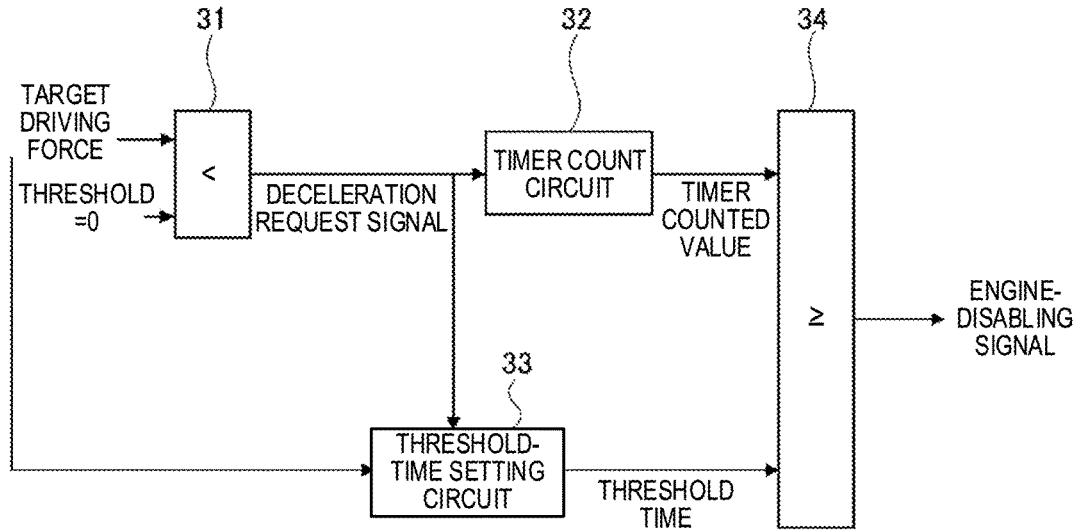
FIG. 4 is a block diagram showing the configuration of an engine-stop control unit in Example 1.

As shown in FIG. 4, the engine-stop control unit 30 has a deceleration-request determination circuit 31, a timer count circuit 32, a threshold-time setting circuit 33, and a counted-time determination circuit 34.

The deceleration-request determination circuit 31 determines whether a system deceleration request is issued or not when the self-driving mode is set. This deceleration-request determination circuit 31 receives the target driving force calculated by the cruise control unit 26 and a preset threshold information (=zero). The deceleration-request determination circuit 31 determines whether the target driving force is less than the threshold information (zero) or not. When the target driving force<zero, the deceleration-request determination circuit 31 determines that the target driving force is the requested deceleration and a system deceleration request is issued, and outputs a deceleration request signal.

The timer count circuit 32 counts the time elapsed after the system deceleration request is issued when the self-driving mode is set. This timer count circuit 32 receives a deceleration request signal from the deceleration-request determination circuit 31. Receiving a deceleration request signal, this timer count circuit 32 counts the time elapsed after this deceleration request signal is input, and outputs a timer counted value.

The threshold-time setting circuit 33 sets a threshold time that is a reference time to determine whether a subtle deceleration request is issued or not, to which a driver typically does not react. This threshold-time setting circuit 33 receives a deceleration request signal from the deceleration-request determination circuit 31 and a target driving force (requested deceleration) calculated by the cruise control unit 26. When the threshold-time setting circuit 33 receives the deceleration request signal from the deceleration-request determination circuit 31 during the self-driving mode, the threshold-time setting circuit 33 then sets a threshold time based on the target driving force (requested deceleration) and the map shown in FIG. 5. This threshold time is set to be longer for a smaller target driving force (requested deceleration) and to be shorter for a larger target driving force (requested deceleration).

The counted-time determination circuit 34 determines, when the self-driving mode is set, whether the time elapsed after issuance of a deceleration request is a threshold time or longer or not. This counted-time determination circuit 34 receives a timer-counted value information from the timer count circuit 32 and the threshold time information from the threshold-time setting circuit 33. When the determination whether the timer counted value is the threshold time or longer by the counted-time determination circuit 34 shows that the timer counted value≥the threshold time, the counted-time determination circuit 34 determines that the braking amount that is the magnitude of the braking force generated by the system deceleration request is the "engine-stopping enabling threshold" or larger, and sets an engine-stopping disabling flag at "zero". This enables stopping of the engine Eng, and allows the shift from the "HEV mode" to the "EV mode". On the contrary, when the timer counted value<the threshold time holds, the counted-time determination circuit 34 determines that the braking amount that is the magnitude of the braking force generated by the system deceleration request is less than the "engine-stopping enabling threshold", and sets the engine-stopping disabling flag at "1". This does not enable stopping of the engine Eng, and disables the shift from the "HEV mode" to the "EV mode".

The "engine-stopping enabling threshold" is a reference value to determine whether the braking amount is a subtle value or not that would not be generated from a driver's deceleration request (i.e., since the deceleration request is subtle, a driver typically would not react to such a request).

In this way, when the self-driving mode is set, the cruise control unit 26 in Example 1 activates the motor generator MG and the friction brake MB for deceleration that are the braking devices in accordance with a deceleration request (system deceleration request).

When the operation mode is the "HEV mode" during deceleration by the system deceleration request, the engine-stop control unit 30 then counts the timer-counted value so as to estimate the braking amount that is the magnitude of the regenerative force generated by the motor generator MG and of the frictional force generated by the friction brake MB. When the estimated braking amount (timer-counted value) is the "threshold time" or more, the engine-stop control unit 30 sets the engine-stopping disabling flag at "zero" to enable the stopping of the engine Eng. When the estimated braking amount (timer-counted value) is less than the "threshold time", the engine-stop control unit 30 performs the "engine-stopping enabling determination" to set the engine-stopping enabling flag at "1" and not to enable the stopping of the engine Eng.

[Configuration of Engine-Stopping Enabling Determination]

Figure 6:
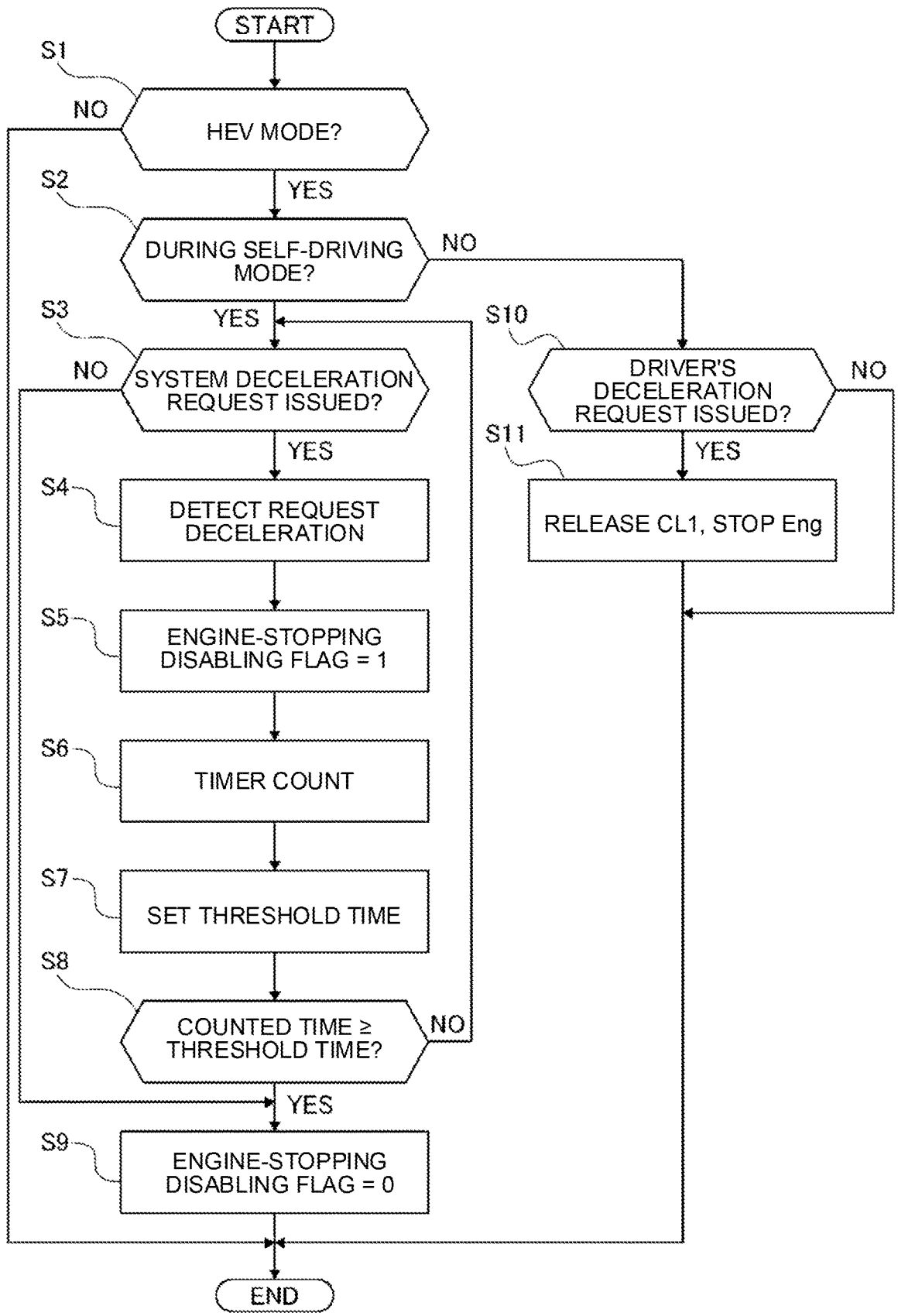
FIG. 6 is a flowchart showing a process of engine-stopping enabling determination executed by an integrated controller of Example 1.

FIG. 6 is a flowchart showing the process of the engine-stopping enabling determination executed by the integrated controller 14 of Example 1. Referring to FIG. 6, the following describes the configuration of the engine-stopping enabling determination in Example 1. The integrated controller 14 repeatedly executes this engine-stopping enabling determination with a preset period during the ON-state of the ignition switch of the FF hybrid vehicle.

At Step S1, the integrated controller 14 determines whether the operation mode is the "HEV mode" or not. In the case of YES (HEV mode), the procedure shifts to Step S1. In the case of NO (EV mode), since this means that the engine Eng is already disconnected from the driving system and is stopped, the procedure shifts to the end.

The integrated controller 14 makes such a determination on the operation mode based on whether the first clutch CL1 is engaged or not. Specifically when the first clutch CL1 is engaged, the integrated controller 14 determines that the operation mode is the "HEV mode".

At Step S2, following the determination of the "HEV mode" at Step S1, the integrated controller 14 determines whether the self-driving mode is set or not. In the case of YES (self-driving mode), the procedure shifts to Step S3. In the case of NO (manual-driving mode), the procedure shifts to Step S10.

The integrated controller 14 makes such a determination on the self-driving mode based on an operation signal of the self-driving switch detected by the self-driving setting switch sensor 24.

At Step S3, following the determination of the self-driving mode being set at Step S2, the integrated controller 14 determines whether a system deceleration request is issued or not. In the case of YES (system deceleration request is issued), the procedure shifts to Step S4. In the case of NO (no system deceleration request is issued), the procedure shifts to Step S9.

The integrated controller 14 determines whether a system deceleration request is issued or not based on the target driving force calculated based on the target vehicle-speed and the actual vehicle-speed. Specifically the determination is made based on whether the target driving force is a negative value or not, i.e., whether requested deceleration is generated or not. When this system deceleration request is issued, the integrated controller 14 executes regenerative-brake control for the motor generator MG and brake-fluid pressure control for the friction brake MB so as to give a braking force for deceleration corresponding to the requested deceleration to the FF hybrid vehicle.

At Step S4, following the determination at Step S3 that the system deceleration request is issued, the integrated controller 14 detects requested deceleration that is output in accordance with the deceleration request issued at Step S3. Then the procedure shifts to Step S5.

The "requested deceleration" means a braking force obtained by combining the braking force from the regenerative force when the braking devices, such as the motor generator MG and the friction brake MB, are activated, with the braking force from the frictional force, the obtained braking force being given to the FF hybrid vehicle. The integrated controller 14 detects requested deceleration that is output at the timing of the determination that the system deceleration request is issued.

At Step S5, following the detection of the requested deceleration at Step S4, the integrated controller 14 sets the engine-stopping disabling flag at "1", and the procedure shifts to Step S6.

This disables the stopping of the engine Eng (not enabling the stopping of the engine Eng). As a result, for example, even when the mode shift condition to the "EV mode" holds based on the requested deceleration and the mode-shift map (FIG. 2), the integrated controller 14 does not execute shifting to the "EV mode", and keeps the "HEV mode".

At Step S6, following the setting of the engine-stopping disabling flag at Step S5, the integrated controller 14 counts the time elapsed after the issuance of the system deceleration request to calculate the counted time. The procedure then shifts to Step S7.

When the procedure goes through this Step S6 for the first time after the issuance of the system deceleration request, the integrated controller 14 starts the timer counting. When the procedure goes through this Step S6 the second time or later after the issuance of the system deceleration request, the integrated controller 14 continues the timer-counting to accumulate the counted time. Such calculation of the counted time enables estimation of the braking amount that shows the magnitude of the braking force.

At Step S7, following the execution of timer-counting at Step S6, the integrated controller 14 sets "threshold time", and the procedure shifts to Step S8.

Figure 5:
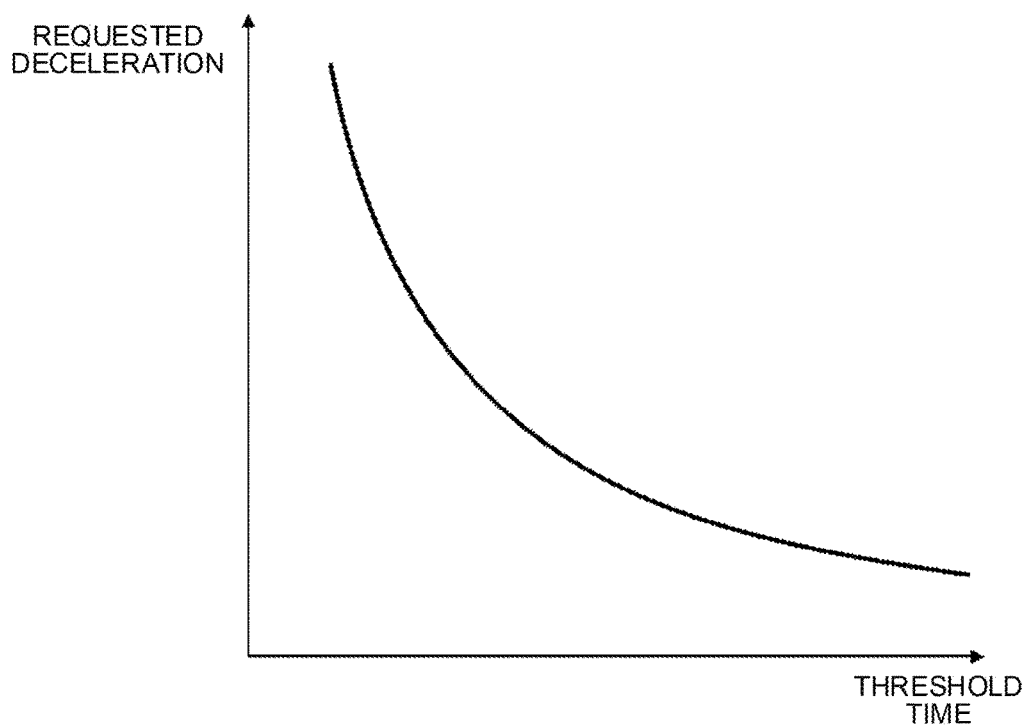
FIG. 5 shows one example of a threshold-time setting map used in Example 1.

The "threshold time" is set in accordance with the requested deceleration detected at Step S4, and may be set based on the map shown in FIG. 5, for example.

At Step S8, following the setting of the threshold time at Step S7, the integrated controller 14 compares the time elapsed after the issuance of the system deceleration request that is counted at Step S6 (counted time) with the threshold time set at Step S7, and so determines whether the counted time is the threshold time or longer or not. In the case of YES (counted time threshold time), the procedure shifts to Step S9 because the braking amount is large. In the case of NO (counted time<threshold time), the procedure returns to Step S3 because the braking amount is small.

At Step S9, following the determination that no system deceleration request is issued at Step S3 or the determination that the counted time threshold time at Step S8, the integrated controller 14 sets the engine-stopping disabling flag at "zero", and the procedure shifts to the end.

This does not request disabling of the stopping of the engine Eng, but enables the stopping of the engine Eng. As a result, for example, when the mode shift condition to the "EV mode" holds based on the requested deceleration and the mode-shift map (FIG. 2), the integrated controller 14 executes "shifting from the HEV mode to the EV mode" to enable the shifting to the "EV mode".

At Step S10, following the determination of setting of the manual-driving mode at Step S2, the integrated controller 14 determines whether a driver's deceleration request is issued or not. In the case of YES (driver's deceleration request is issued), the procedure shifts to Step S11. In the case of NO (no driver's deceleration request is issued), the procedure shifts to the end.

Such a determination about the issuance or not of a driver's deceleration request is made based on whether the driver performs or not the operation to release the foot from the accelerator pedal or to press the brake pedal BP.

At Step S11, following the determination at Step S10 that the driver's deceleration request is issued, the integrated controller 14 releases the first clutch CL1 and stops the engine Eng, and the procedure shifts to the end.

That is, when a driver's deceleration request is issued, the integrated controller 14 shifts the operation mode to the "EV mode".

Next the following describes the functions.

The following firstly describes "problems about engine-stopping/restarting hunting in different driving modes", and then describes the functions of the vehicle control method of Example 1 about the "function to suppress engine-stopping/restarting hunting" and "other characteristic functions".

[Problems about Engine-Stopping/Restarting Hunting in Different Driving Modes]

A hybrid vehicle runs while intermittently activating the engine Eng. When the manual-driving mode is set for such a vehicle to let the driver operate the accelerator pedal and the brake pedal for vehicle-speed control, a driver's braking operation (the operation to release the foot from the accelerator or to press the brake), if any, generates a driver's deceleration request, and the hybrid vehicle controls the regenerative force of the motor generator MG and the frictional force of the friction brake MB in accordance with the driver's deceleration request and generates a braking force. At this time, the engine Eng is disconnected from the driving system for efficient power-generation so as to avoid the loss of regenerative energy at the motor generator MG due to engine friction, and the engine Eng then is stopped to save the fuel during braking.

When the self-driving mode is set for the vehicle so that the actual vehicle-speed of the vehicle keeps a target vehicle-speed without any pedal operation by the driver, this self-driving mode generates a subtle deceleration request and a deceleration request in a very short time that would not be generated from a driver's braking operation. Such a request is to bring the vehicle-speed and the inter-vehicle distance close to their target values. When such a system deceleration request is issued, this case also controls the regenerative force of the motor generator MG and the frictional force of the friction brake MB in accordance with the requested deceleration to generate a braking force.

The self-driving mode is configured so as to, when the actual vehicle-speed falls below the target value, accelerate the vehicle and when the actual vehicle-speed exceeds the target value, decelerate the vehicle, and so let the actual vehicle-speed follow the target vehicle-speed. The target driving force (requested acceleration or requested deceleration) therefore may fluctuate in a subtle range. Specifically when the vehicle-speed or the inter-vehicle distance is brought close to their target values, a driving scene having subtle deceleration and acceleration again immediately after the deceleration may occur.

In this way when the engine Eng stops in accordance with a system deceleration request during the self-driving mode, the target driving force (requested acceleration or requested deceleration) may fluctuate immediately after that, and such a fluctuation may cause an acceleration request. In that case, the engine Eng may have to be restarted. Such stopping and restarting of the engine Eng in a short time bothers the driver.

During the manual-driving mode, the driver expects an acceleration request because they operate the corresponding pedal, and restarting of the engine immediately after the engine stopping will not give the driver a feeling of strangeness or will not bother the driver. On the contrary, during the self-driving mode, the driver does not operate the accelerator pedal and the brake pedal. The driver therefore does not expect a deceleration request or an acceleration request, and so "engine-stopping/restarting hunting", if any, may seriously bother the driver. In other words, the driver's sensitivity to the "engine-stopping/restarting hunting" increases during the self-driving mode.

In this way, the "engine-stopping/restarting hunting" more easily occurs during the self-driving mode than during the manual-driving mode. Further, a certain driving scene, which would not bother the driver during the manual-driving mode, may bother the driver during the self-driving mode.

[Function to Suppress Engine-Stopping/Restarting Hunting]

The integrated controller 14 of the FF hybrid vehicle in Example 1 is configured to, when a system deceleration request is issued during the self-driving mode, determine whether or not to disable the stopping of the engine Eng based on the magnitude (braking amount) of the requested deceleration.

Specifically the integrated controller 14 first determines whether the operation mode is the "HEV mode" or not (Step S1). When the operation mode is the "HEV mode", the procedure shifts to Step S2, and the integrated controller 14 determines whether the self-driving mode is set or not. When the self-driving mode is set, the procedure shifts to Step S3, and the integrated controller 14 determines whether a system deceleration request is issued or not.

When a system deceleration request is issued, i.e., when the condition of the "HEV mode", the "self-driving mode", and the "system deceleration request being issued" holds, then the procedure shifts as in Step S4→Step S5→Step S6→Step S7→Step S8.

That is, the integrated controller 14 detects requested deceleration and sets the engine-stopping disabling flag at "1". This means that the stopping of the engine Eng is not enabled. Subsequently, the integrated controller 14 counts the time elapsed after the system deceleration request is issued, and sets a threshold time in accordance with the requested deceleration. Then the integrated controller 14 determines whether the counted time is the threshold time or longer or not.

When the counted time is less than the threshold time, the integrated controller 14 determines that the braking amount that is the magnitude of the braking force generated by the system deceleration request is less than the "engine-stopping enabling threshold". Then the procedure returns to Step S3, where the integrated controller 14 determines again whether a system deceleration request is issued or not. When a system deceleration request is issued, the integrated controller 14 executes again the procedure of Step S4 or later. During this process, the engine-stopping disabling flag is kept at "1", and so the integrated controller 14 continuously disables the stopping of the engine Eng. That is, the "HEV mode" is kept as the operation mode.

In this way, when the braking amount is less than the "engine-stopping enabling threshold" and a subtle deceleration request is issued, to which a driver typically would not react, the integrated controller 14 does not enable the stopping of the engine Eng. A driving scene having a subtle deceleration and acceleration again immediately after the deceleration, if any, during the self-driving mode does not cause the engine-stopping/restarting hunting, and so does not bother the driver.

When the counted time is the threshold time or longer, the integrated controller 14 determines that the braking amount that is the magnitude of the braking force generated by the system deceleration request is the "engine-stopping enabling threshold" or more. Then the procedure shifts to Step S9, and the integrated controller 14 sets the engine-stopping disabling flag at "zero". This enables the stopping of the engine Eng. As a result, the operation mode is allowed to shift to the "EV mode". When a predetermined EV shift condition holds, the integrated controller 14 releases the first clutch CL1 and stops the engine Eng to shift to the "EV mode".

In this way, when the braking amount is the "engine-stopping enabling threshold" or more and that is the scene to brake the FF hybrid vehicle, the integrated controller 14 enables the stopping of the engine Eng. In this way, when the integrated controller 14 determines that no engine-stopping/restarting hunting occurs during the self-driving mode, the integrated control 14 adequately stops the engine Eng for efficient power generation.

[Other Characteristic Functions]

As stated above, Example 1 estimates a braking force from the requested deceleration, and sets a threshold time in accordance with this braking force (requested deceleration). When the time (counted time) elapsed after the issuance of a system deceleration request is the threshold time or longer, this example determines that the braking amount is the engine-stopping enabling threshold or more. When the time (counted time) elapsed after the issuance of a system deceleration request is less than the threshold time, this example determines that the braking amount is less than the engine-stopping enabling threshold.

That is, Example 1 determines whether the braking amount is the engine-stopping enabling threshold or more or not, based on the relationship between the time elapsed after the issuance of a system deceleration request and the threshold time set in accordance with the requested deceleration.

This simplifies the calculation, and enables a determination in a short time. This avoids engine-stopping/restarting hunting more adequately.

In Example 1, the regenerative force from the motor generator MG during the regenerative braking control is used as the braking force to be given to the vehicle. In this way, the motor generator MG functions as a braking device to give a braking force to the FF hybrid vehicle in response to a deceleration request.

This configuration gives a braking force to the FF hybrid vehicle while recovering the regenerative energy, and so enables energy-efficient driving.

Receiving the wheel cylinder hydraulic pressure, the friction brake MB gives a friction force generated with the wheel cylinder WC as a braking force to the vehicle. In Example 1, this friction brake MB functions as a braking device to give a braking force to the FF hybrid vehicle in response to a deceleration request.

In this way, the friction brake MB that typical vehicles include is used as a braking device common to the self-driving mode and the manual-driving mode, and this simplifies the system. When the friction brake MB and the motor generator MG operate together as the braking device, Example 1 obtains the braking force in accordance with a deceleration request from the regenerative force of the motor generator MG and the frictional force of the friction brake MB in a collaboration manner. As a result, Example 1 achieves adequate braking as well as energy-efficient driving.

Next the following describes the advantageous effects.

The vehicle control method and control device in Example 1 have the following advantageous effects.

(1) A method controls a vehicle including: a braking device (motor generator MG, friction brake MB) configured to give a braking force to the vehicle in accordance with a driver's deceleration request in response to a driver's braking operation when an operation mode of the vehicle is not set as self-driving (set as a manual-driving mode); and an engine Eng configured to stop in response to an activation of the braking device (motor generator MG, friction brake MB), and the method includes:

when the operation mode is set as self-driving (set as a self-driving mode), activating the braking device (motor generator MG, friction brake MB) in accordance with a system deceleration request to keep the actual vehicle-speed at a target vehicle-speed or change the actual vehicle-speed at the target vehicle-speed or lower depending on the environment surrounding the vehicle; and estimating a braking amount (requested deceleration) that is a magnitude of a braking force generated from the activated braking device (motor generator MG, friction brake MB), and when the braking amount (requested deceleration) is an engine-stopping enabling threshold or more, enabling stopping of the engine Eng and when the braking amount (requested deceleration) is less than the engine-stopping enabling threshold, not enabling stopping of the engine Eng.

The method therefore suppresses an increase in the frequency of stopping and restarting of the engine Eng when the braking device is activated during the self-driving mode.

(2) The braking device is the motor generator MG configured to give a driving force to the vehicle during stopping of the engine Eng, and enable regeneration, and the method uses a regenerative force of the motor generator MG as the braking force.

In addition to the advantageous effect of (1), this configuration gives a braking force to the vehicle while recovering the regenerative energy, and so enables energy-efficient driving.

(3) The braking device is the friction brake MB of the vehicle, and the method uses a frictional force of the friction brake MB as the braking force.

In addition to the advantageous effect of (1) or (2), this configuration simplifies the system, and when the friction brake MB and the motor generator MG operate together as the braking device, this configuration achieves adequate braking as well as energy-efficient driving.

(4) The method sets a threshold time in accordance with the braking force (requested deceleration). When the time (counted time) elapsed after the system deceleration request is issued is the threshold time or longer, the method determines that the braking amount (requested deceleration) is the engine-stopping enabling threshold or more, and enables stopping of the engine Eng. When the time (counted time) elapsed after the system deceleration request is issued is less than the threshold time, the method determines that the braking amount is less than the engine-stopping enabling threshold, and does not enable stopping of the engine Eng.

In addition to any one of the advantageous effects of (1) to (3), this simplifies the calculation, and avoids engine-stopping/restarting hunting more adequately.

(5) A vehicle control device (integrated controller 14) controls a vehicle including: a braking device (motor generator MG, friction brake MB) configured to give a braking force to the vehicle in accordance with a driver's deceleration request in response to a driver's braking operation when an operation mode of the vehicle is not set as self-driving (set as a manual-driving mode); and an engine Eng configured to stop in response to an activation of the braking device (motor generator MG, friction brake MB), and the vehicle control device includes:

a vehicle-speed control unit (cruise control unit 26) configured to, when the operation mode is set as self-driving (set as a self-driving mode), activate the braking device (motor generator MG, friction brake MB) in accordance with a system deceleration request to keep the actual vehicle-speed at a target vehicle-speed or change the actual vehicle-speed at the target vehicle-speed or lower depending on the environment surrounding the vehicle; and an engine-stop control unit 30 configured to detect or estimate a braking amount (requested deceleration) that is a magnitude of a braking force generated from the activated braking device (motor generator MG, friction brake MB), and when the braking amount (requested deceleration) is an engine-stopping enabling threshold or more, to enable stopping of the engine Eng and when the braking amount (requested deceleration) is less than the engine-stopping enabling threshold, not to enable stopping of the engine Eng.

This control device suppresses an increase in the frequency of stopping and restarting of the engine Eng when the braking device is activated during the self-driving mode.

Example 2

Example 2 estimates a braking amount generated during the self-driving mode by adding up a braking force during the time to give the braking force.

Figure 7:
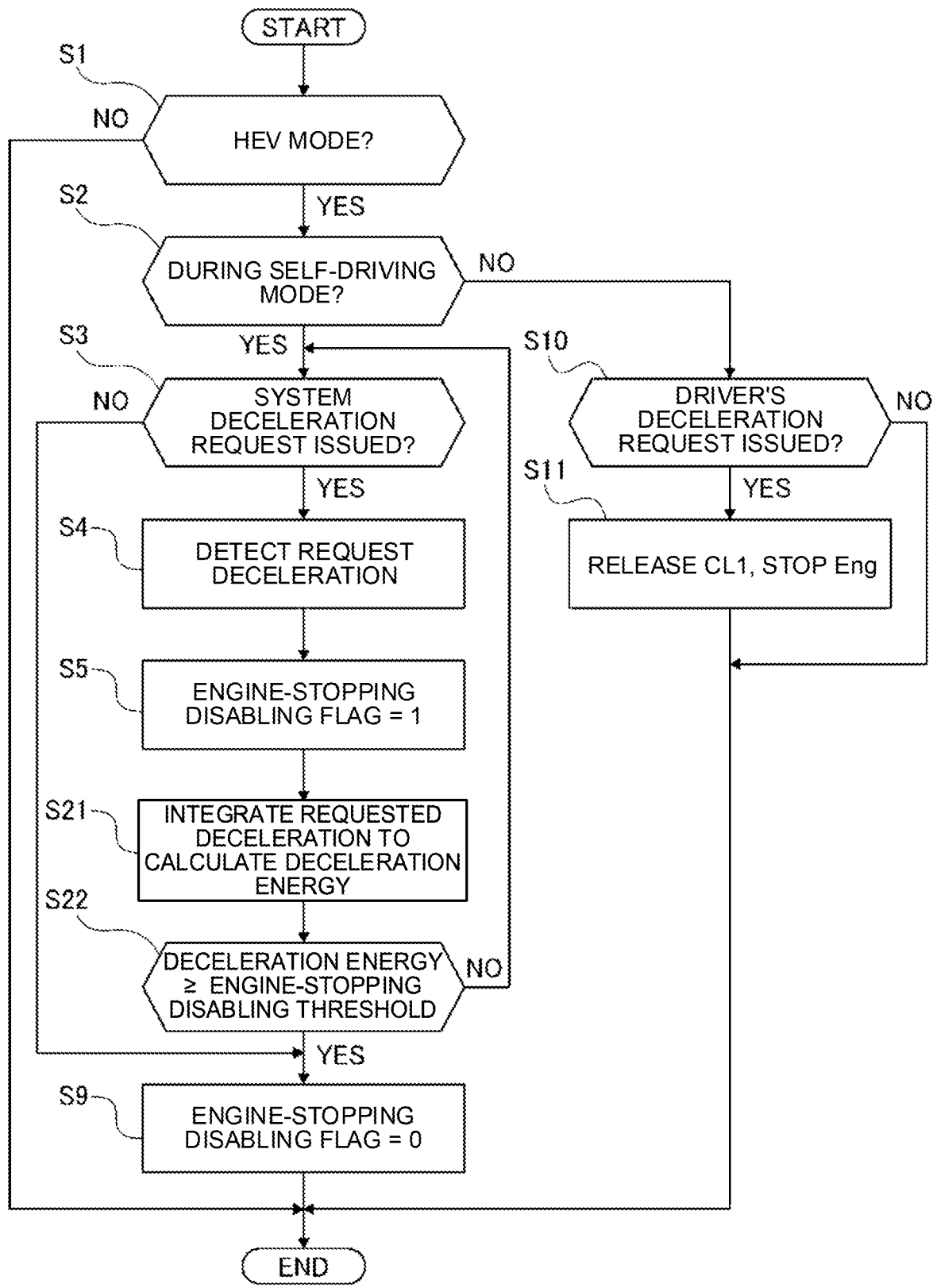
FIG. 7 is a flowchart showing the process of the engine-stopping enabling determination in Example 2.

FIG. 7 is a flowchart showing the process of the engine-stopping enabling determination executed by the integrated controller of Example 2. Referring to FIG. 7, the following describes the configuration of the engine-stopping enabling determination in Example 2. Like numerals are used to denote like steps in Example 1 to omit their detailed descriptions. Example 2 also repeatedly executes the engine-stopping enabling determination with a preset period during the ON-state of the ignition switch of the FF hybrid vehicle.

At Step S21, following the setting of an engine-stopping disabling flag at Step S5, the integrated controller calculates deceleration energy in accordance with a system deceleration request that is determined as issuance at Step S3, and the procedure shifts to Step S22.

The "deceleration energy" is a value obtained by multiplying the braking force given to the FF hybrid vehicle in accordance with the system deceleration request and the braking time to give this braking force. In this example, the "deceleration energy" is obtained by integrating the requested deceleration detected at Step S4.

At Step S22, following the calculation of the deceleration energy at Step S21, the integrated controller determines whether the deceleration energy calculated at Step S21 is a preset engine-stopping enabling threshold or more or not. In the case of YES (deceleration energy engine-stopping enabling threshold), the procedure shifts to Step S9 because the braking amount is large. In the case of NO (deceleration energy<engine-stopping enabling threshold), the procedure returns to Step S3 because the braking amount is small.

The "engine-stopping enabling threshold" is a reference value to determine whether the deceleration energy (=braking force×braking time) is a subtle value or not that would not be generated from a driver's deceleration request, and this engine-stopping enabling threshold is set at any constant value through experiments, for example.

In this way, the vehicle control method of Example 2 integrates the requested deceleration that is a braking force given to the FF hybrid vehicle to calculate deceleration energy, and compares this deceleration energy with the engine-stopping enabling threshold and controls the engine-stopping enabling flag based on the comparison result. In other words, Example 2 integrates a braking force (requested deceleration) from the braking device, such as the motor generator MG to generate a regenerative force or a friction brake MB to generate a frictional force, to detect a braking amount that is the magnitude of this braking force.

This facilitates the calculation of the braking amount, and enables a determination in a short time. This avoids engine-stopping/restarting hunting more adequately.

Next the following describes the advantageous effects.

The vehicle control method of Example 2 has the following advantageous effects.

(6) The method integrates a braking force from the braking device (motor generator MG, friction brake MB) to detect the braking amount.

This facilitates the calculation of the braking amount, and avoids engine-stopping/restarting hunting more adequately.

The above describes a vehicle control method and a control device of the present disclosure by way of Example 1 and Example 2, and the specific configuration of the present disclosure is not limited to these examples. The design may be changed or may have additions without departing from the scope of the invention according to the following claims.

Figure 8:
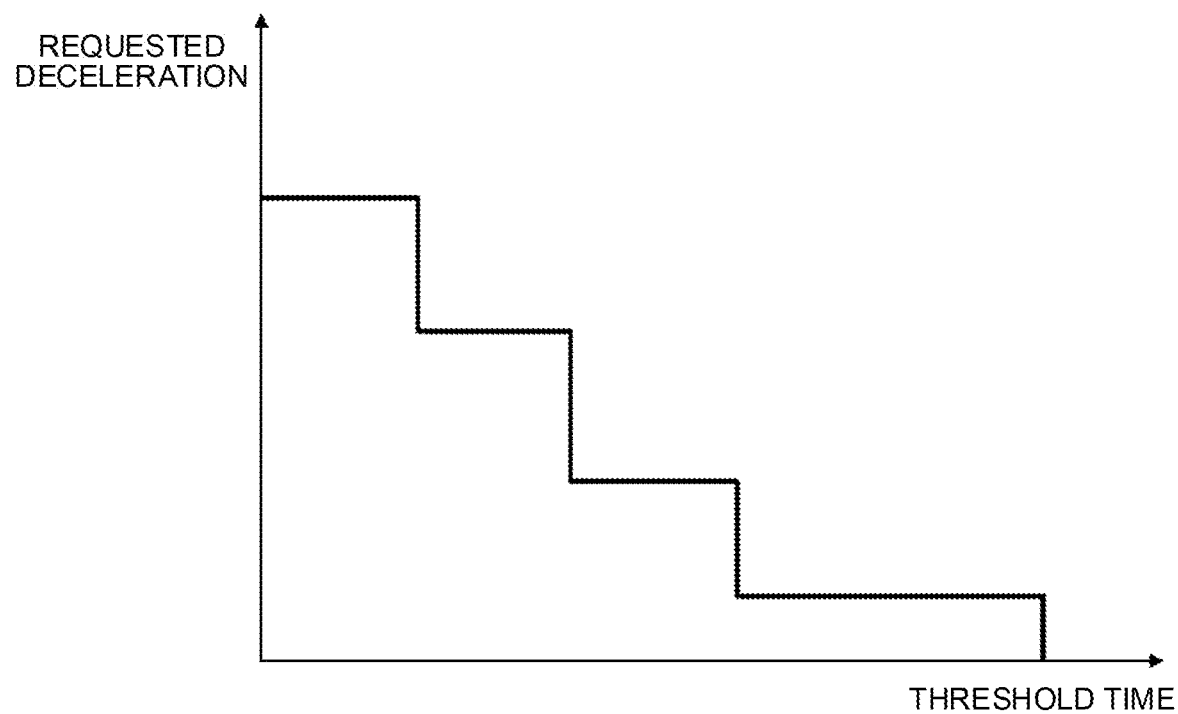
FIG. 8 shows another example of the threshold-time setting map.

Example 1 shows the example of the map (FIG. 5) setting the threshold time in accordance with the requested deceleration, where the threshold time smoothly varies inversely proportional to the requested deceleration. In another example, as shown in FIG. 8, for example, the threshold time may be set using a map in which the threshold time varies in a stepwise manner relative to the requested deceleration.

Figure 9:
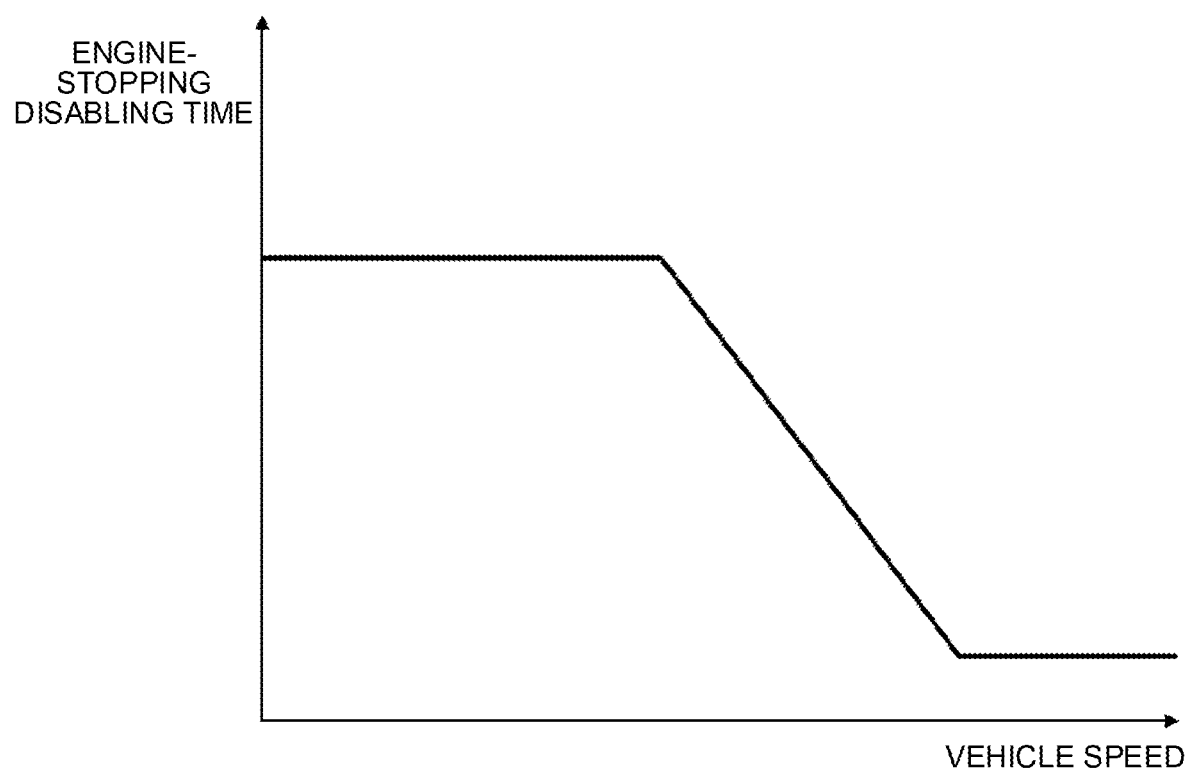
FIG. 9 shows one example of a map to set an engine-stopping disabling time in accordance with a vehicle-speed.

To suppress EV-HEV hunting, stopping of the engine Eng may be disabled (i.e., setting the engine-stopping disabling flag="1") irrespective of the magnitude of the braking force (braking amount) during the time of the "engine-stopping disabling time" set based on the map shown in FIG. 9 and the vehicle-speed after the operation mode is set at "HEV mode". After the elapse of this "engine-stopping disabling time", the engine-stopping disabling flag may be controlled based on the relationship between the braking amount and the engine-stopping enabling threshold.

The vehicle control methods in Example 1 and Example 2 are applied to an FF hybrid vehicle including a parallel hybrid driving system called a 1-motor/2-clutche type. This is not a limiting example, and the vehicle control method of the present disclosure may be applied to any vehicle as long as the vehicle runs while intermittently activating the engine Eng automatically (repeating stopping and restarting of the engine) when the ignition switch is ON. That is, the vehicle control method may be applied to a vehicle enabling coast driving (running while stopping the engine for deceleration), idling stop (stopping the engine during parking) and sailing driving (running while shifting to neutral and stopping the engine for deceleration), for example.

The invention claimed is:

1. A vehicle control method that controls a vehicle including: a braking device configured to give a braking force to the vehicle in accordance with a driver's deceleration request in response to a driver's braking operation when an operation mode of the vehicle is not set as self-driving; and an engine configured to stop in response to an activation of the braking device, the method comprising:
 when the operation mode is set as self-driving, activating the braking device in accordance with a system deceleration request to keep an actual vehicle-speed at a target vehicle-speed or change the actual vehicle-speed at the target vehicle-speed or lower depending on environment surrounding the vehicle;
 detecting or estimating a braking amount that is a magnitude of a braking force generated from the activated braking device;
 setting a threshold time in accordance with the braking force; and
 when time elapsed after the system deceleration request is issued is the threshold time or longer, determining that the braking amount is an engine-stopping enabling threshold or more, and enabling stopping of the engine, and when the time elapsed after the system deceleration request is issued is less than the threshold time, determining that the braking amount is less than the engine-stopping enabling threshold, and not enabling stopping of the engine.

2. A vehicle control method that controls a vehicle including: a braking device configured to give a braking force to the vehicle in accordance with a driver's deceleration request in response to a driver's braking operation when an operation mode of the vehicle is not set as self-driving; and an engine configured to stop in response to an activation of the braking device, the method comprising:
 when the operation mode is set as self-driving, activating the braking device in accordance with a system deceleration request to keep an actual vehicle-speed at a target vehicle-speed or change the actual vehicle-speed at the target vehicle-speed or lower depending on environment surrounding the vehicle;

integrating a braking force from the braking device to detect or estimate a braking amount that is a magnitude of a braking force generated from the activated braking device during operation of the braking device; and when the braking amount is an engine-stopping enabling threshold or more, enabling stopping of the engine, and when the braking amount is less than the engine-stopping enabling threshold, not enabling stopping of the engine, wherein the method uses at least one of
- a regenerative force of a motor generator as the braking amount, or
- a frictional force of a friction brake as the braking amount.

3. A vehicle control device configured to control a vehicle including: a braking device configured to give a braking force to the vehicle in accordance with a driver's deceleration request in response to a driver's braking operation when an operation mode of the vehicle is not set as self-driving; and an engine configured to stop in response to an activation of the braking device, the vehicle control device comprising:

a vehicle-speed control unit configured to, when the operation mode is set as self-driving, activate the braking device in accordance with a system deceleration request to keep an actual vehicle-speed at a target vehicle-speed or change the actual vehicle-speed at the target vehicle-speed or lower depending on environment surrounding the vehicle;

an engine-stop control unit configured to detect or estimate a braking amount that is a magnitude of a braking force generated from the activated braking device; set a threshold time in accordance with the braking force; and when time elapsed after the system deceleration request is issued is the threshold time or longer, determine that the braking amount is an engine-stopping enabling threshold or more, and enable stopping of the engine, and when the time elapsed after the system deceleration request is issued is less than the threshold time, determine that the braking amount is less than the engine-stopping enabling threshold, and not enable stopping of the engine.

4. The vehicle control method according to claim 1, wherein the braking device is a motor generator configured to give a driving force to the vehicle during stopping of the engine, and enable regeneration, and the method uses a regenerative force of the motor generator as the braking force.

5. The vehicle control method according to claim 1, wherein the braking device is a friction brake of the vehicle, and the method uses a frictional force of the friction brake as the braking force.

* * * * *